(12) United States Patent
Wu

(10) Patent No.: US 11,689,970 B2
(45) Date of Patent: Jun. 27, 2023

(54) INTER-RADIO ACCESS TECHNOLOGY HANDOVER

(71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/528,314

(22) Filed: Jul. 31, 2019

(65) Prior Publication Data

US 2020/0045590 A1 Feb. 6, 2020

Related U.S. Application Data

(60) Provisional application No. 62/715,049, filed on Aug. 6, 2018.

(51) Int. Cl.
| | |
|---|---|
| *H04W 36/00* | (2009.01) |
| *H04W 36/08* | (2009.01) |
| *H04W 8/08* | (2009.01) |
| *H04W 80/08* | (2009.01) |
| *H04W 76/30* | (2018.01) |
| *H04W 80/02* | (2009.01) |

(52) U.S. Cl.
CPC ......... *H04W 36/0022* (2013.01); *H04W 8/08* (2013.01); *H04W 36/08* (2013.01); *H04W 76/30* (2018.02); *H04W 80/02* (2013.01); *H04W 80/08* (2013.01)

(58) Field of Classification Search
CPC .............................................. H04W 36/0022
See application file for complete search history.

(56) References Cited

U.S. PATENT DOCUMENTS

| | | | |
|---|---|---|---|
| 9,942,806 B2 | 4/2018 | Uchino et al. | |
| 2015/0312813 A1* | 10/2015 | Xu | H04W 36/0058 455/438 |
| 2016/0249259 A1* | 8/2016 | Park | H04W 36/0055 |
| 2017/0222876 A1* | 8/2017 | Van Der Velde | H04W 36/0079 |

(Continued)

FOREIGN PATENT DOCUMENTS

| | | |
|---|---|---|
| JP | 2016514922 | 5/2016 |
| RU | 2489809 | 8/2013 |

(Continued)

OTHER PUBLICATIONS

"Foreign Office Action", Taiwanese Application No. 108127790, dated Apr. 28, 20, 6 pages.

(Continued)

*Primary Examiner* — Jason E Mattis
(74) *Attorney, Agent, or Firm* — Colby Nipper PLLC

(57) ABSTRACT

This document describes methods and devices for a handover of a user equipment (110) from a Fifth Generation (5G) New Radio (NR) base station (121) to an Evolved Universal Terrestrial Radio Access (E-UTRA) base station (122). The user equipment (110) may determine to release or keep a Packet Data Convergence Protocol (PDCP) entity (312) depending on the whether the E-UTRA base station (122) is connected to an Evolved Packet Core (160) network or a Fifth Generation Core (150) network. The user equipment (110) may determine to release or keep the PDCP entity (312) depending based on a received NR Radio Resource Control (RRC) message or E-UTRA RRC message.

12 Claims, 11 Drawing Sheets

(56) References Cited

U.S. PATENT DOCUMENTS

| | | | |
|---|---|---|---|
| 2017/0257792 A1 | 9/2017 | Kim et al. | |
| 2017/0295524 A1 | 10/2017 | Malkamaki et al. | |
| 2018/0302834 A1 | 10/2018 | Zhang et al. | |
| 2019/0132891 A1* | 5/2019 | Wu | H04W 80/08 |
| 2019/0150037 A1* | 5/2019 | Mildh | H04W 36/0038 370/331 |
| 2019/0254074 A1* | 8/2019 | Jeon | H04W 56/001 |
| 2020/0077317 A1* | 3/2020 | Sharma | H04W 36/08 |
| 2020/0178113 A1* | 6/2020 | Jin | H04W 28/0268 |
| 2020/0396789 A1* | 12/2020 | Hori | H04W 76/20 |
| 2021/0168882 A1* | 6/2021 | Chang | H04W 76/30 |
| 2021/0337436 A1* | 10/2021 | Teyeb | H04W 36/0038 |

FOREIGN PATENT DOCUMENTS

| | | |
|---|---|---|
| TW | I501665 | 9/2015 |
| WO | 2011162224 | 12/2011 |
| WO | 2015171040 | 11/2015 |

OTHER PUBLICATIONS

"3GPP TR 38.912 V15.0.0", 3GPP TR 38.912 V15.0.0, Jun. 2018, 74 pages.

"Flow Based QoS Framework for LTE Connected to 5GC (TP to TS 36.331)", 3GPP TSG-RAN WG2 #102, Busan, S. Korea, May 21-25, 2018, May 2018.

"International Search Report and Written Opinion", PCT Application No. PCT/US2019/043974, dated Sep. 10, 19, 18 pages.

"Stage 3 Details on Inter RAT HO Between NR and (e)LTE", 3GPP TSG RAN WG2 Meeting NR adhoc 1807, Montreal, Canada, Jul. 2-6, 2018, Jul. 2018, 16 pages.

"TP to 36.331 for Handover Between NR and E-ULTRA", 3GPP TSG-RAN WG2#AH1807, Montreal, Canada, Jul. 2-6, 2018, Jul. 2018, 26 pages.

"Introduction of SA", 3GPP TSG-WG2 Meeting #102AH R2-1810388, Montreal, Canada, Jul. 2-6, 2018.

"International Preliminary Report on Patentability", Application No. PCT/US2019/043974, dated Feb. 9, 2021, 10 pages.

"Foreign Notice of Allowance", RU Application No. 2021102733, dated Aug. 24, 2021, 21 pages.

"Foreign Office Action", TW Application No. 108127790, dated Jan. 7, 2022, 4 pages.

"Foreign Office Action", IN Application No. 202147003812, dated Jan. 7, 2022, 6 pages.

"Foreign Office Action", EP Application No. 19750231.3, dated Oct. 7, 2021, 9 pages.

"Foreign Office Action", TW Application No. 110106354, dated Oct. 29, 2021, 9 pages.

"TP to 36.331 for handover between NR and E-UTRA", 3GPP TSG-RAN WG2#AH1807-R2-1810378, Jul. 2018, 26 pages.

Huawei, et al., "CR on message content in inter-RAT handover", 3GPP Draft; R2-1809299, 3rd Generation Partnership Project (RGPP), Mobile Competence Centre; 650, Route Des Lucioles; F-06921 Sophia-Antipolis Cedex France; RAN WG2; Busan, Korea; May 21, 2018, XP051520623, Jun. 7, 2018, 3 pages.

"Foreign Office Action", JP Application No. 2021-504791, dated Mar. 15, 2022, 3 pages.

\* cited by examiner

INTER-RADIO ACCESS TECHNOLOGY HANDOVER

CROSS REFERENCE TO RELATED APPLICATIONS

This present disclosure claims priority to PCT Application Serial No. PCT/US2019/043974 filed Jul. 29, 2019 which in turn claims priority to U.S. Provisional Patent Application Ser. No. 62/715,049 filed Aug. 6, 2018 the disclosures of which are incorporated by reference herein in their entireties.

BACKGROUND

The evolution of wireless communication to fifth generation (5G) standards and technologies provides higher data rates and greater capacity with improved reliability and lower latency that enhances mobile broadband services. 5G technologies also provide new classes of service for vehicular networking, fixed wireless broadband, and the Internet of Things (IoT).

As 5G networks are deployed, Long Term Evolution (LTE) networks will provide broader areas of coverage and fill gaps in 5G network deployments. Inter-radio access technology handovers for user equipment are required to provide 5G and LTE interoperability. However, conventional techniques for inter-radio access technology (inter-RAT) handovers do not address techniques for handovers between 5G and LTE networks.

SUMMARY

This summary is provided to introduce simplified concepts of an inter-radio access technology handover. The simplified concepts are further described below in the Detailed Description. This summary is not intended to identify essential features of the claimed subject matter nor is it intended for use in determining the scope of the claimed subject matter.

In aspects, methods, devices, systems, and means for inter-radio access technology handovers are described, in which a user equipment (UE) communicates with the source base station using a Medium Access Control entity, a Radio Link Control entity, and a first Packet Data Convergence Protocol entity. The UE receives a first Radio Resource Control message from the source base station, the first Radio Resource Control message including a second Radio Resource Control message for the handover to the target base station. In response to the receiving the first Radio Resource Control message or the second Radio Resource Control message, the UE releases the Medium Access Control entity and the Radio Link Control entity and determines a configuration type from an indication of a configuration type included in the second Radio Resource Control message.

For example, a user equipment may comprise: a wireless transceiver; a processor; and instructions for a handover manager application that are executable by the processor to configure the user equipment to perform the described user equipment methods. Similarly, a user equipment may comprise: a wireless transceiver; and a handover manager arranged to perform, and/or to configure the user equipment to perform, the described user equipment methods. Similarly, the invention provides a user equipment arranged to perform the described user equipment methods.

In aspects, methods, devices, systems, and means for inter-radio access technology handovers are described, in which a source base station receives a first Radio Resource Control message indicating a handover of a user equipment to a target base station. The source base station determines a configuration type to be applied to the user equipment during the handover and generates a second Radio Resource Control message. The source base station includes an indication of the configuration type in the second Radio Resource Control message and includes the first Radio Resource Control message in the second Radio Resource Control message. The source base station transmits the second Radio Resource Control message to the user equipment to direct the user equipment to modify a current user equipment configuration, based the configuration type during the handover.

For example, a base station may comprise: a wireless transceiver; a core network interface; an inter-base station interface; a processor; and instructions for a base station manager application that are executable by the processor to configure the base station to perform the described base station methods. Similarly, a base station may comprise: a wireless transceiver; a core network interface; an inter-base station interface; and a base station manager arranged to perform, and/or to configure the base station to perform, the described base station methods. Similarly, the invention provides a base station arranged to perform the described base station methods.

BRIEF DESCRIPTION OF THE DRAWINGS

Aspects of an inter-radio access technology handover are described with reference to the following drawings. The same numbers are used throughout the drawings to reference like features and components.

DETAILED DESCRIPTION

Overview

Figure 1:
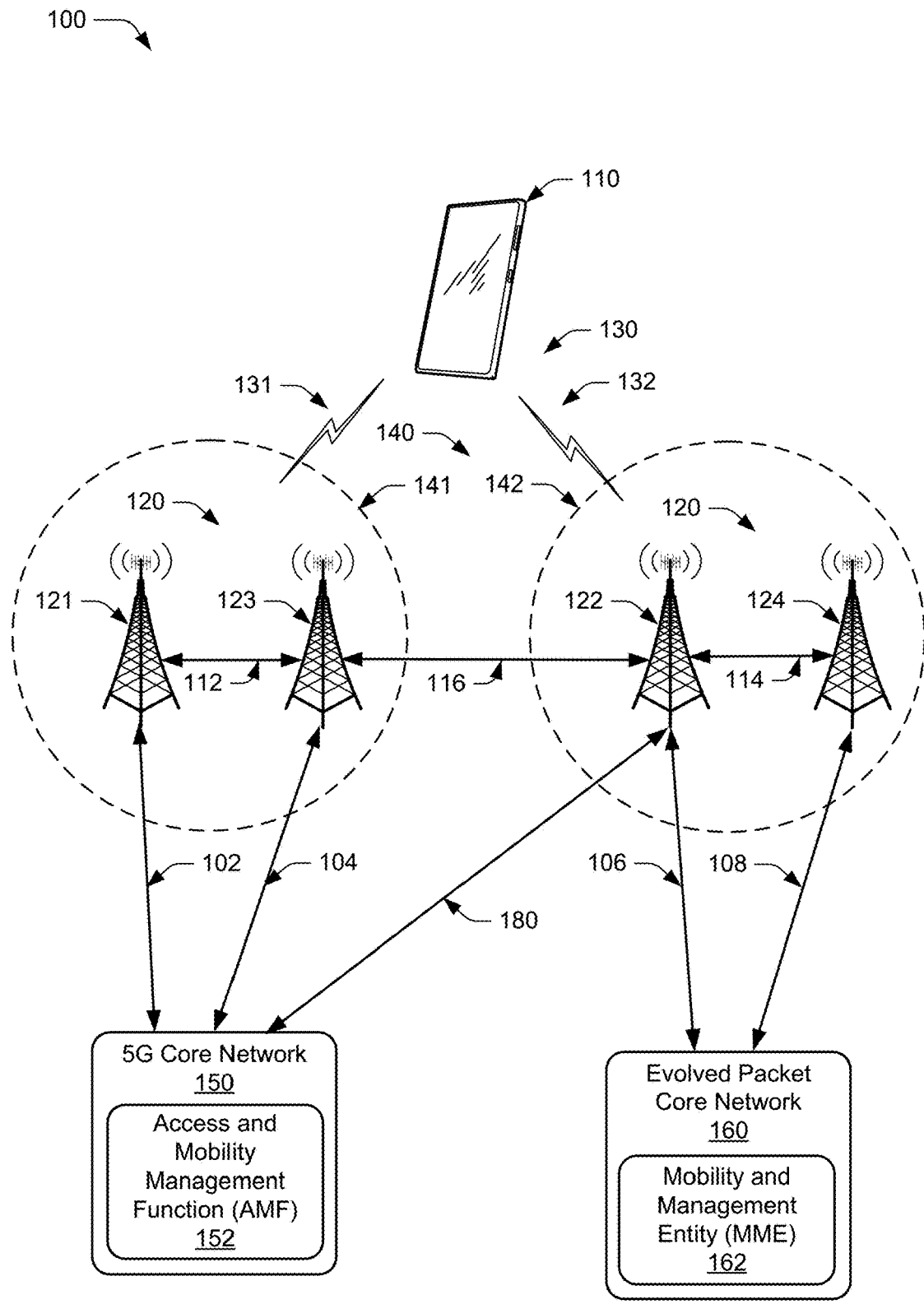
FIG. 1 illustrates an example wireless network environment in which various aspects of an inter-radio access technology handover can be implemented.

This document describes methods and devices for a handover of a user equipment (UE) from a source base station (e.g., Fifth Generation (5G) New Radio (NR) base station) to a target base station (e.g., an Evolved Universal Terrestrial Radio Access (E-UTRA) base station). The UE may determine to release or keep a Packet Data Convergence Protocol (PDCP) entity depending on the whether the E-UTRA base station is connected to an Evolved Packet Core (EPC) network or a Fifth Generation Core (5GC) network. The UE may determine to release or keep the PDCP entity based on a received NR Radio Resource Control (RRC) message or an E-UTRA RRC message. The UE may also receive an indication of whether to apply a full configuration or a delta configuration, based on whether the E-UTRA base station is connected to the 5GC network or connected to the EPC network.

The control signaling for a handover from a 5G NR base station to an E-UTRA base station may be communicated between base stations with or without the involvement of a core network access and mobility management function (AMF). For example, when the base stations setup a handover without the core network, the 5G NR base station sends a Handover Request message to the E-UTRA base station, the E-UTRA base station replies with a Handover Request Acknowledge message including an EUTRA RRC message, the 5G NR base station generates an NR RRC message including the EUTRA RRC message, and the 5G NR base station transmits the NR RRC message to the UE. The UE 110 connects to the E-UTRA base station indicated in the EUTRA RRC message and transmits an EUTRA RRC response message to the E-UTRA base station.

In another example, when the base stations setup a handover involving the core network, the 5G NR base station sends a Handover Required message to the AMF in the core network and the AMF sends a Handover Request message to the E-UTRA base station. In response, the E-UTRA base station sends a Handover Request Acknowledge message including an EUTRA RRC message, to the AMF. The AMF sends a Handover Command to the 5G NR base station, which generates an NR RRC message including the EUTRA RRC message, and transmits the NR RRC message to the user equipment. The UE 110 connects to the E-UTRA base station indicated in the EUTRA RRC message and transmits an EUTRA RRC response message to the E-UTRA base station.

In another example, when the base station sets up a handover involving the core network, the 5G NR base station sends a Handover Required message to the AMF in the core network and the AMF sends a Forward Relocation Request message to the mobility management entity (MME). The MME sends a Handover Request message to the E-UTRA base station. In response, the E-UTRA base station sends a Handover Request Acknowledge message including an EUTRA RRC message, to the MME. The MME sends a Forward Relocation Response message including the EUTRA RRC message, to the AMF. The AMF sends a Handover Command including the EUTRA RRC message, to the 5G NR base station, which generates an NR RRC message including the EUTRA RRC message, and transmits the NR RRC message to the user equipment. The UE 110 connects to the E-UTRA base station indicated in the EUTRA RRC message and transmits an EUTRA RRC response message to the E-UTRA base station.

In aspects, an inter-radio access technology handover provides new interfaces, messages, and management functions to support coordination of communications between cellular and WLAN networks and to manage mobility of user equipment and data traffic of the user equipment between cellular and WLAN networks.

While features and concepts of the described systems and methods for an inter-radio access technology handover can be implemented in any number of different environments, systems, devices, and/or various configurations, aspects of the inter-radio access technology handover are described in the context of the following example devices, systems, and configurations.

Example Environment

FIG. 1 illustrates an example environment 100, which includes a user equipment 110 (UE 110) that communicates with one or more base stations 120 (illustrated as base stations 121, 122, 123, and 124) through one or more wireless communication links 130 (wireless link 130), illustrated as wireless links 131 and 132. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 via the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN). The RANs 140 are illustrated as a NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, a base station 122 in the E-UTRAN 142 may connect to the 5GC 150 and EPC 160 networks.

The base stations 121 and 123 connect, at 102 and 104 respectively, to the 5GC 150 via an NG2 interface for control-plane signaling and via an NG3 interface for user-plane data communications. The base stations 122 and 124 connect, at 106 and 108 respectively, to the EPC 160 via an S1 interface for control-plane signaling and user-plane data communications. Optionally or additionally, if the base station 122 connects to the 5GC 150 and EPC 160 networks, the base station 122 connects to the 5GC 150 via an NG2 interface for control-plane signaling and via an NG3 interface for user-plane data communications, at 180.

In addition to connections to core networks, base stations 120 may communicate with each other. The base stations 121 and 123 communicate via an Xn interface at 112. The base stations 122 and 124 communicate via an X2 interface at 114. The base station 122, which is connected to both the 5GC 150 and the EPC 160, may communication with the base stations 121 and/or 123 using the Xn interface, as illustrated at 116.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility and Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110, via the base stations 120.

Example Devices

Figure 2:
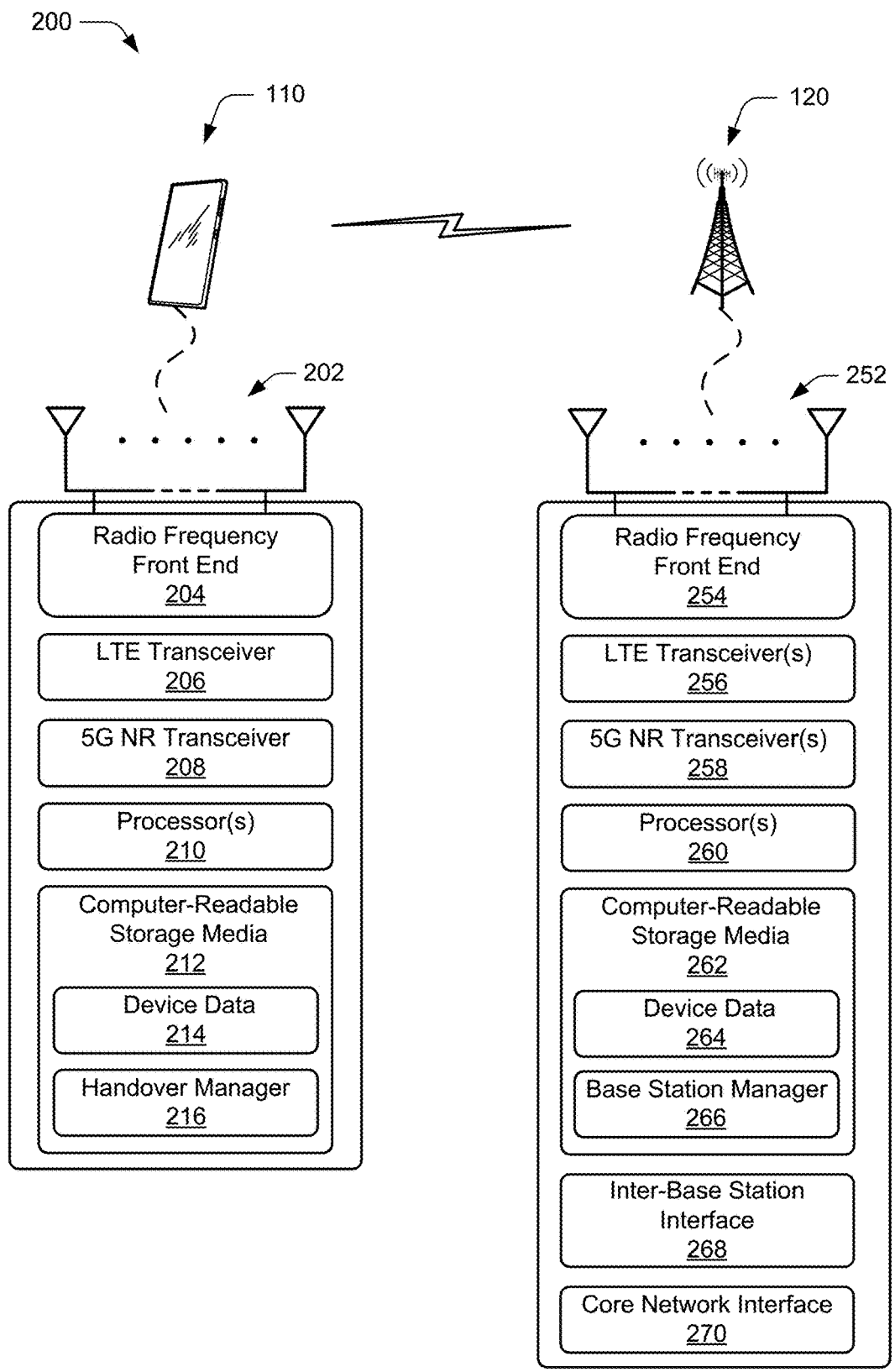
FIG. 2 illustrates an example device diagram for devices that can implement various aspects of an inter-radio access technology handover environment.

FIG. 2 illustrates an example device diagram 200 of the UE 110, the base stations 120. The UE 110, the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5GNR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5GNR communication standards and implemented by the LTE transceiver 206, and/or the 5GNR transceiver 208. Additionally, the antennas 202, the RF front end 204, the LTE transceiver 206, and/or the 5GNR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5GNR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

CRM 212 also includes a handover manager 216. Alternately or additionally, the handover manager 216 may be implemented in whole or part as hardware logic or circuitry integrated with or separate from other components of the UE 110. In at least some aspects, the handover manager 216 configures the RF front end 204, the LTE transceiver 206, and/or the 5G NR transceiver 208 to implement the techniques for an uplink handover pilot described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

User Plane and Control Plane Signaling

Figure 3:
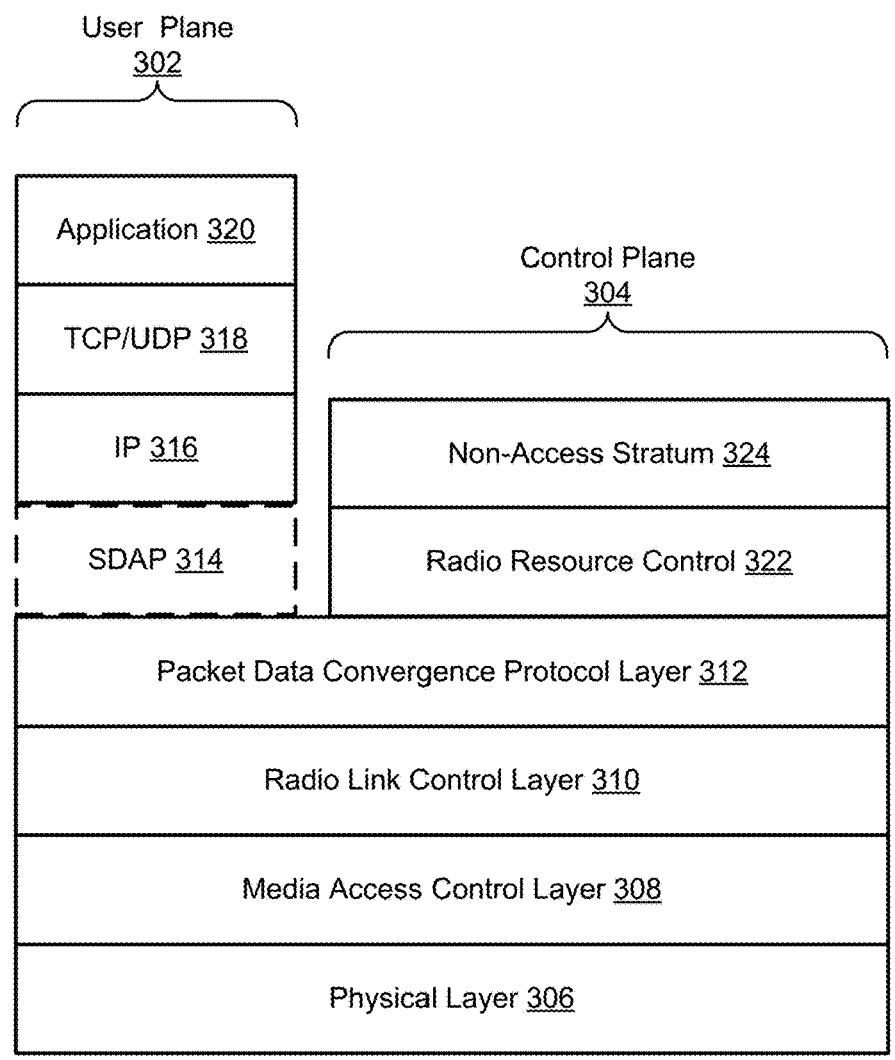
FIG. 3 illustrates an example wireless networking stack with which aspects of an inter-radio access technology handover can be implemented.

FIG. 3 illustrates an example block diagram of a wireless network stack model 300 that characterizes a communication system for the example environment 100, in which various aspects of an inter-radio access technology handover can be implemented. The wireless network stack 300 includes a user plane 302 and a control plane 304. Upper layers of the user plane 302 and the control plane 304, share common lower layers in the wireless network stack 300. Wireless devices such as the UE 110 or base stations 120 implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 306 (PHY layer 306), a Media Access Control layer 308 (MAC layer 308), a Radio Link Control layer 310 (RLC layer 310), and a Packet Data Convergence Protocol layer 312 (PDCP layer 312). The physical layer 306 provides hardware specifications for devices that communicate with each other. As such, the physical layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the wireless network stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the wireless network stack 300. Generally, the PDCP layer 312 provides transfer of user plane 302 and control plane 304 data, header compression, ciphering, and integrity protection.

Above the PDCP layer 312, the wireless network stack splits into the user-plane stack 302 and the control-plane stack 304. The user plane 302 layers include an optional Service Data Adaptation Protocol layer 314 (SDAP 314), an Internet Protocol layer 316 (IP 316), a Transmission Control Protocol/User Datagram Protocol layer 318 (TCP/UDP 318), and an application 320 that transfer data via the wireless link 106. The optional SDAP layer 314 is present in 5G NR networks and maps a Quality of Service (QoS) flow for each data radio bearer and marks QoS flow identifiers in uplink and downlink data packets for each packet data session. The IP layer 316 specifies how the data from the application 320 is transferred to a destination node. The TCP/UDP layer 318 is used to verify that data packets intended to be transferred to the destination node reached the destination node, using either TCP or UDP for data transfers by the application 320.

The control plane 304 includes Radio Resource Control 322 (RRC 322) and a Non-Access Stratum 324 (NAS 324). The RRC 322 establishes and releases connections and radio bearers, broadcasts system information, performs power control, and so forth. The NAS 324 provides support for mobility management and packet data bearer contexts between the user equipment 110 and entities or functions in the core network, such as the Access and Mobility Management Function 152 (AMF 152), or the Mobility Management Entity 162 (MME 162), or the like.

In the UE 110, each layer in both the user plane 302 and the control plane 304 of the wireless network stack 300 interacts with a corresponding peer layer or entity in a base station 120, a core network entity or function, and/or a remote service, to support user applications and control operation of the UE 110 in the NR RAN 141 or the E-UTRAN 142.

In the following examples, the term "keep" may be replaced by the term "maintain." For example, the term "keep" describes continuing to operate using a previously applied configuration, such as a UE keeps (or maintains) a measurement configuration for making successive measurements.

Example Methods

Example methods 400-1100 are described with reference to FIGS. 4-11 in accordance with one or more aspects of an inter-radio access technology handover. The situations under which a UE releases or keeps (and reestablishes) its PDCP entity depend on implementations of various RRC messages. For example, a configuration indicator in an E-UTRA RRC message may be a full configuration indicator or a delta configuration indicator. As another example, the E-UTRA RRC message may include a PDCP reestablishment indicator or a PDCP non-reestablishment indicator. The existence and interplay of these types of indicators in a received E-UTRA RRC message may instruct when a UE should release or keep its PDCP entity and also instruct when a UE should reestablish or not-reestablish a PDCP entity. In some implementations, an absence of a full configuration indicator instructs a UE to keep its PDCP entity. In other implementations, only a delta configuration indicator instructs a UE to keep its PDCP entity. In other implementations, an applied configuration indicator in a 5G NR RRC message instructs the UE to keep or release its PDCP entity.

The target base station for a handover, in this case the base station 122, determines whether or not to include an indication to apply a full configuration in an E-UTRA RRC message based on the type of source base station (a base station connected to 5GC 150, a 5G NR base station, an E-UTRAN base station, a GERAN base station, or a UTRAN base station) and the type of target base station (an E-UTRAN base station connected to the 5GC, or an E-UTRAN base station connected to the EPC 160) The inclusion, or not, of the indication to apply a full configuration is used by the UE during the handover to determine whether to keep or release various entities in the wireless networking stack 300.

The order in which the method blocks are described is not intended to be construed as a limitation, and any number of the described method blocks can be combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

User Equipment Inter-Radio Technology Handover Methods

With respect to methods 400-600 which will be described individually with respect to FIGS. 4-6 later, when the UE 110 receives the E-UTRA RRC message, the UE 110 connects to the base station 122 (the E-UTRA cell) indicated in the E-UTRA RRC message and applies one or more configurations in the E-UTRA RRC message to communicate with the base station 122. For example, the UE 110 performs a random access procedure with the base station 122 by using a random access configuration in the E-UTRA RRC message. In the random access procedure, the user equipment 110 transmits a random access preamble to the base station 122 and receives a random access response from the base station 122.

When the UE 110 applies the full configuration, the UE 110 releases the PDCP entity 312, which includes a PDCP configuration that configures the communication of PDCP protocol data units with the base station 121. The UE 110 may receive the PDCP configuration from the base station 121 or another 5G NR base station 120, such as the base station 123. The UE 110 may establish a new PDCP entity 312 with a new PDCP configuration as specified in the E-UTRA RRC message. The new PDCP entity 312 uses the new PDCP configuration to communicate PDCP PDUs with the base station 122. The new PDCP configuration may be a new NR PDCP configuration or an E-UTRA PDCP configuration.

When the UE 110 applies the full configuration, the UE 110 releases the SDAP entity 314. That is, the UE 110 releases a SDAP configuration used by the SDAP entity 314 to communicate with the base station 121. The UE 110 may receive the SDAP configuration from the base station 121 or the base station 123. The UE 110 may establish a new SDAP entity 314 with a new SDAP configuration as specified in the E-UTRA RRC message. The new SDAP entity 314 uses the new SDAP configuration to communicate SDAP PDUs with the base station 123.

When the UE 110 applies the delta configuration, the UE 110 keeps the PDCP entity 312. The UE 110 keeps an original PDCP configuration (e.g., a NR PDCP configuration) used by the PDCP entity 312 to communicate PDCP PDUs with the base station 121. The UE 110 may receive the original PDCP configuration from the base station 121 or the base station 123. If the E-UTRA RRC message does not include a new PDCP configuration information, the UE 110 keeps using the original PDCP configuration to communicate PDCP PDUs with the base station 123. If the E-UTRA RRC message includes new PDCP configuration information, the UE 110 reconfigures the PDCP entity 312 to the new PDCP configuration.

When the UE 110 applies the delta configuration, the UE 110 keeps the SDAP entity 314 and continues to use the original SDAP configuration of that SDAP entity 314 to communicate SDAP PDUs with the base station 121. The UE 110 may receive the original SDAP configuration information from the base station 121 or the base station 123. If the E-UTRA RRC message does not include a new SDAP configuration, the UE 110 continues to use the current SDAP configuration to communicate SDAP PDUs with the base station 123. If the E-UTRA RRC message includes a new SDAP configuration information, the UE 110 reconfigures the SDAP entity 314 to the new SDAP configuration.

The E-UTRA RRC message may configure the UE 110 to communicate using an E-UTRA cell served by the base station 122. The UE 110 connects via the E-UTRA cell to the base station 122 and transmits an E-UTRA RRC response message to the base station 122 via the E-UTRA cell. The UE 110 does not transmit an NR RRC response message responding to the NR RRC message. The UE 110 disconnects from the base station 121 in response to the NR RRC message or the E-UTRA RRC message.

The UE 110 may determine the E-UTRA RRC message is for a handover to the E-UTRA base station 122 that is connected to 5GC 150, if the E-UTRA RRC message configures the UE 110 to connect to 5GC 150.

The UE 110 may determine the E-UTRA RRC message is for a handover to the E-UTRA base station 124 that is connected to EPC 160, if the E-UTRA RRC message configures the UE 110 to connect to EPC 160 or does not configure the UE 110 to connect to 5GC 150.

In an additional aspect, the UE 110 may release the PDCP entity 312 if the E-UTRA RRC message includes a full configuration indicator indicating that the UE 110 shall apply the full configuration. In a further aspect, the UE 110 may release the PDCP entity 312 if the E-UTRA RRC message does not include the full configuration indicator.

To complete the handover, the UE 110 establishes a Packet Data Convergence Protocol entity with the target base station. If a Service Data Adaptation Protocol entity was established with the source base station, the UE 110 establishes a Service Data Adaptation Protocol entity with the target base station. To indicate that the handover is complete, the UE 110 transmits an RRCConnectionConfigurationComplete message.

Figure 4:
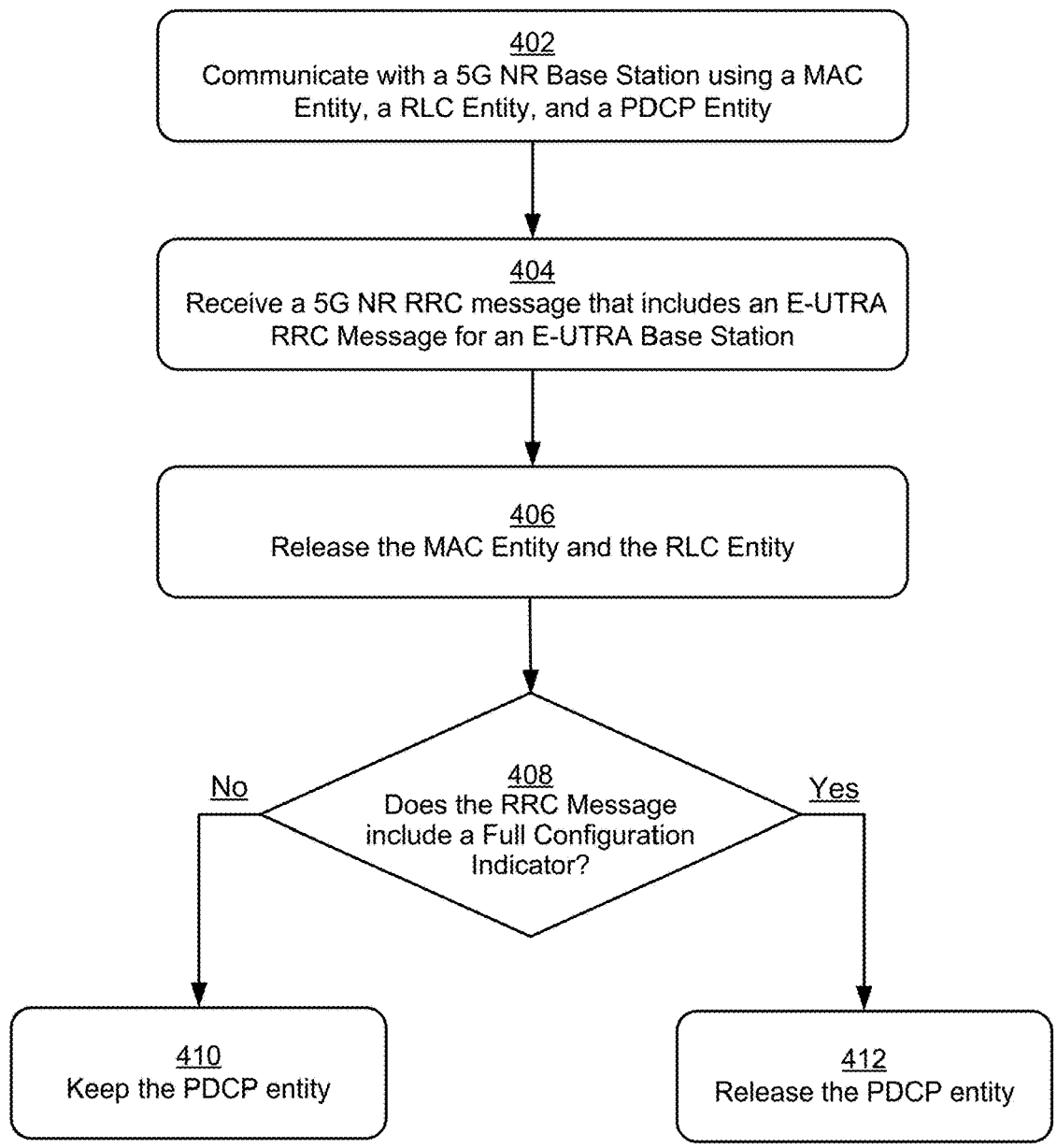
FIG. 4 illustrates an example method of an inter-radio access technology handover as generally related to protocol processing by the user equipment in accordance with aspects of the techniques described herein.

FIG. 4 illustrates example method(s) 400 of an inter-radio access technology handover as generally related to protocol processing by the UE 110 in a handover in accordance with aspects of the techniques described herein. At block 402, a UE communicates with a source 5G NR base station using a Medium Access Control (MAC) entity, a Radio Link Control (RLC) entity, and a Packet Data Convergence Protocol (PDCP) entity. For example, the UE 110 communicates with the 5G NR base station 121 using the MAC entity 308, the RLC entity 310, and the PDCP entity 312.

At block 404, the UE receives a 5G NR Radio Resource Control (RRC) message (e.g., an RRCConnectionConfiguration message), from the 5G NR base station, that includes an E-UTRA RRC message for a handover to a target E-UTRA base station that is connected to a 5G core network. For example, the UE 110 receives a 5G NR RRC message, from the 5G NR base station 121, that includes an E-UTRA RRC message for a handover to the E-UTRA base station 122 that is connected to the 5GC 150. The E-UTRA RRC message includes an indication the base station 122 is connected to the 5GC 150 or the EPC 160.

At block 406, in response to receiving the 5G NR RRC message that contains the E-UTRA RRC message, the UE releases the MAC entity and the RLC entity. For example, in response to receiving the 5G NR RRC message or the E-UTRA RRC message, the UE 110 releases the MAC entity 308 and the RLC entity 310.

At block 408, the UE determines if the E-UTRA RRC message includes a full configuration indicator (e.g., a fullConfig field in the RRCConnectionReconfiguration message). If the E-UTRA RRC message does not include the full configuration indicator, the UE keeps the PDCP entity, at block 410. If the E-UTRA RRC message includes the full configuration indicator, the UE releases the PDCP entity, at block 412. For example, the UE 110 determines if the E-UTRA RRC message includes a full configuration indicator. If the E-UTRA RRC message does not include the full configuration indicator, the UE 110 keeps the PDCP entity 312. If the E-UTRA RRC message includes the full configuration indicator, the UE 110 releases the PDCP entity 312.

The situations under which a UE reestablishes its PDCP entity may depend on various implementations of the configuration indicator (full or not-full; delta or not-delta) and other indications (explicit reestablishment indicator or implicit reestablishment indicator). In one aspect, the UE 110 may reestablish the PDCP entity 312 if the E-UTRA RRC message does not include the full configuration indicator. The UE 110 may not reestablish the PDCP entity 312 if the E-UTRA RRC message does not include the full configuration indicator and indicates that the UE continues to use the PDCP entity 312 that was established for NR communications. In another aspect, the E-UTRA RRC message may include an indication to reestablish the PDCP entity 312. If the E-UTRA RRC message does not include the indication, the UE 110 does not reestablish the PDCP entity 312. If the E-UTRA RRC message includes the indication, the UE 110 reestablishes the PDCP entity 312. Conversely, the E-UTRA RRC message may include an indication to not-reestablish the PDCP entity 312. If the E-UTRA RRC message includes the indication, the UE 110 does not establish the PDCP entity 312; if the E-UTRA RRC message does not include the indication, the UE 110 reestablishes the PDCP entity 312.

In an additional aspect, the UE 110 may release the PDCP entity 312 if the E-UTRA RRC message is for a handover to an E-UTRA base station 120 that is connected to the EPC 160 regardless of whether the E-UTRA RRC message includes a full configuration indicator.

In another aspect, at block 402 the UE 110 may communicate with the 5G NR base station 121 by using the MAC entity 308, the RLC entity 310, the PDCP entity 312, and the SDAP entity 314. In this case, the UE 110 releases the SDAP entity 314 at block 412.

In a further aspect, if the E-UTRA RRC message does not include the full configuration indicator, the E-UTRA RRC message may or may not include a delta configuration indicator. The UE 110 may apply the full configuration included in the E-UTRA RRC message at block 412 or apply the delta configuration message at block 410.

Figure 5:
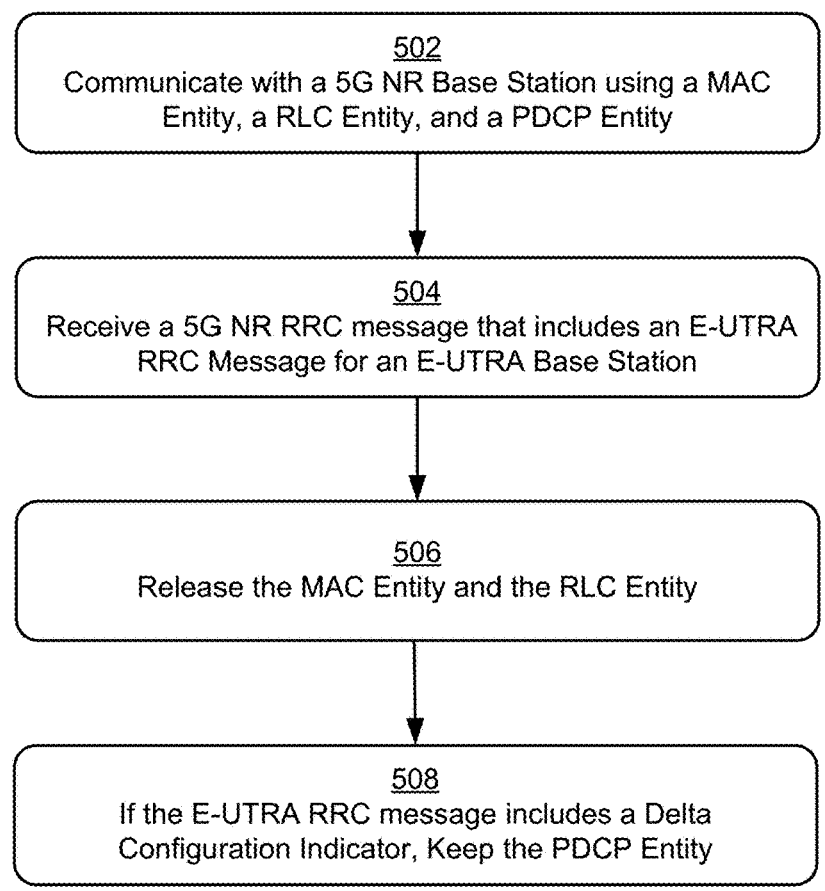
FIG. 5 illustrates an example method of an inter-radio access technology handover as generally related to protocol processing by the user equipment in a handover of the user equipment accordance with aspects of the techniques described herein.

FIG. 5 illustrates example method(s) 500 of an inter-radio access technology handover as generally related to protocol processing by the UE 110 in a handover from the source 5G NR base station 121 to the target E-UTRA base station 122. At block 502, a UE communicates with a 5G NR base station using a Medium Access Control (MAC) entity, a Radio Link Control (RLC) entity, and a Packet Data Convergence Protocol (PDCP) entity. For example, the UE 110 communicates with the 5G NR base station 121 using the MAC entity 308, the RLC entity 310, and the PDCP entity 312.

At block 504, the UE receives a 5G NR RRC message (e.g., an RRCConnectionConfiguration message), from the 5G NR base station, that includes an E-UTRA RRC message for a handover to an E-UTRA base station. For example, the UE 110 receives a 5G NR RRC message, from the 5G NR base station 121, that includes an E-UTRA RRC message for the E-UTRA base station 122.

At block 506, in response to receiving the 5G NR RRC message or the E-UTRA RRC message, the UE releases the MAC entity and the RLC entity. For example, in response to receiving the 5G NR RRC message or the enclosed E-UTRA RRC message, the UE 110 releases the MAC entity 308 and the RLC entity 310.

At block 508, if the E-UTRA RRC message includes a delta configuration indicator, the UE keeps the PDCP entity. If the E-UTRA RRC message does not include a delta configuration indicator (for example, the message includes a full configuration indicator indicating that the UE is to apply the full configuration), the UE 110 keeps the PDCP entity 312. In a further aspect, at block 508, the UE 110 may release the PDCP entity 312, if the E-UTRA RRC message neither includes the full configuration indicator, nor includes the delta configuration indicator.

In another aspect, at block 502 the UE 110 may communicate with the base station 121 by using the MAC entity 308, the RLC entity 310, the PDCP entity 312, and the SDAP entity 314. In this case, the UE 110 keeps the SDAP entity 314 at block 508.

Figure 6:
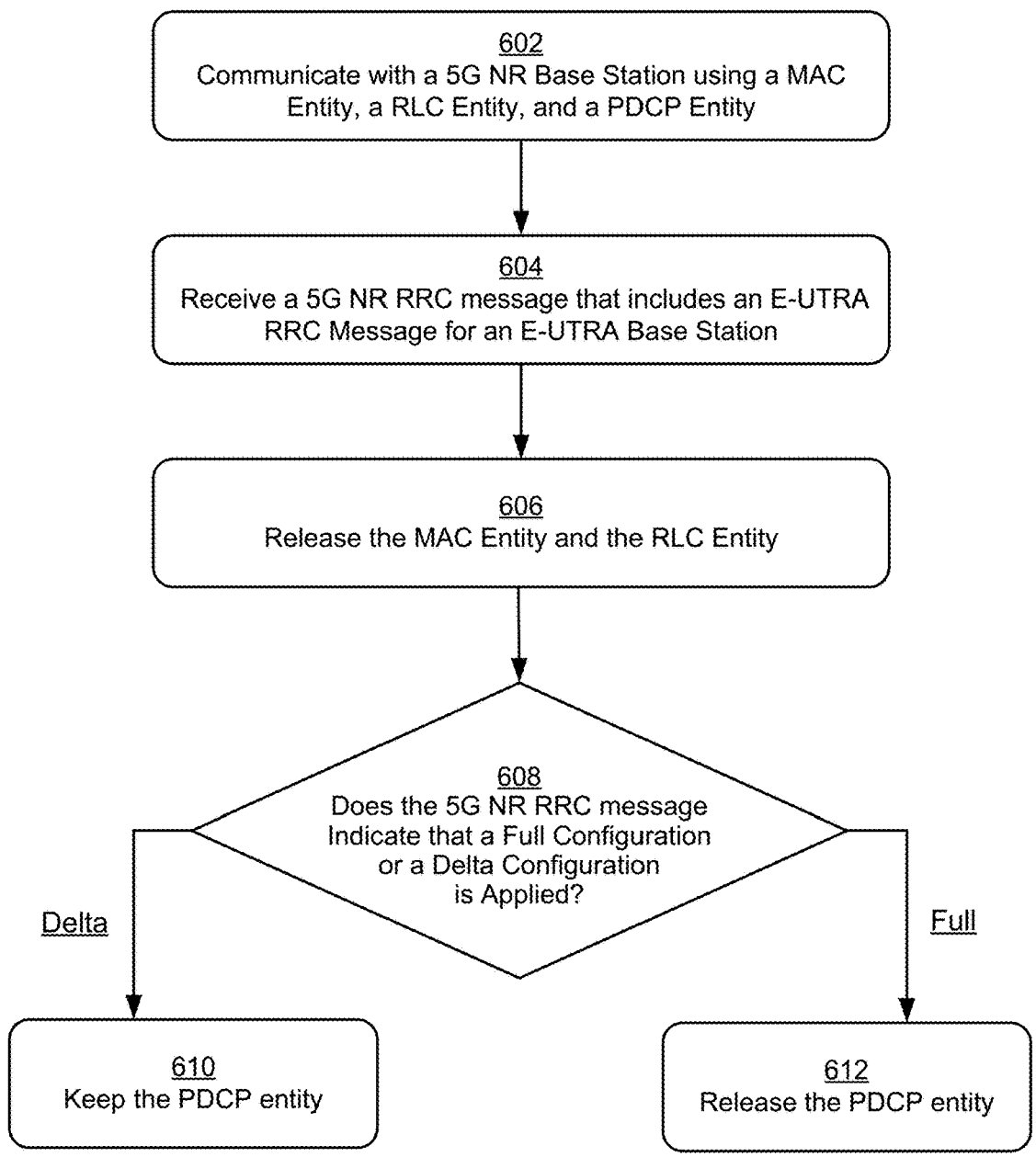
FIG. 6 illustrates an example method of an inter-radio access technology handover as generally related to protocol processing by the user equipment in a handover of the user equipment accordance with aspects of the techniques described herein.

FIG. 6 illustrates example method(s) 600 of an inter-radio access technology handover as generally related to protocol processing by the UE 110 in a handover from the source 5G NR base station 121 to the target E-UTRA base station 122. At block 602, a UE communicates with a 5GNR base station using a Medium Access Control (MAC) entity, a Radio Link Control (RLC) entity, and a Packet Data Convergence Protocol (PDCP) entity. For example, the UE 110 communicates with the 5GNR base station 121 using the MAC entity 308, the RLC entity 310, and the PDCP entity 312.

At block 604, the UE receives a 5GNR Radio Resource Control (RRC) message (e.g., an RRCConnectionConfiguration message), from the 5G NR base station that includes an E-UTRA RRC message for a handover to an E-UTRA base station. For example, the UE 110 receives a 5G NR RRC message, from the 5G NR base station 121, that includes an E-UTRA RRC message for a handover to the E-UTRA base station 122. The E-UTRA RRC message neither indicates that the UE 110 shall apply the full configuration, nor indicates that the UE 110 shall apply the delta configuration. An indication to apply the full configuration or the partial configuration is included in the NR RRC message (e.g., a fullConfig field in the RRCConnectionReconfiguration message).

At block 606, in response to receiving the 5G NR RRC message or the E-UTRA RRC message, the UE releases the MAC entity and the RLC entity. For example, in response to receiving the 5G NR RRC message or the E-UTRA RRC message, the UE 110 releases the MAC entity 308 and the RLC entity 310.

At block 608, the UE determines if the NR RRC message indicates that the UE 110 shall apply a full configuration or a delta configuration. If the delta configuration is applied, the UE 110 keeps the PDCP entity, at block 610. If the full configuration is applied, the UE releases the PDCP entity, at block 612. For example, the UE 110 determines if the NR RRC message indicates that a full configuration or a delta configuration is applied. If the delta configuration is applied, the UE 110 keeps the PDCP entity 312. If the full configuration is applied, the UE 110 releases the PDCP entity 312.

In another aspect, when the delta configuration is indicated in the NR RRC message, the UE 110 applies the delta configuration for the E-UTRA RRC message. When the full configuration is indicated in the NR RRC message, the UE 110 applies the full configuration for the E-UTRA RRC message.

In a further aspect, at block 602 the UE 110 may communicate with the base station 121 by using the MAC entity 308, the RLC entity 310, the PDCP entity 312, and the SDAP entity 314. In this case, the UE 110 releases the SDAP entity 314 at block 612.

In an additional aspect, if the NR RRC message does not include the full configuration indicator, the NR RRC message may or may not include a delta configuration indicator. The UE 110 may apply the full configuration included in the NR RRC message at block 610 or apply the delta configuration message at block 612.

In an aspect, the 5G NR RRC message may include a full configuration indicator to indicate that the UE 110 shall apply the full configuration for the E-UTRA RRC message instead of using the full configuration indicator indicated in the E-UTRA RRC message. The E-UTRA RRC message does not include the full configuration indicator. The UE applies the full configuration in response to the full configuration indicator in the 5G NR RRC message. In one example, the 5G NR RRC message may indicate that the UE 110 shall apply the delta configuration for the E-UTRA RRC message if the 5G NR RRC message does not include the full configuration indicator.

In one example, the NR RRC message may include a delta configuration indicator to indicate that the UE 110 shall apply the delta configuration in the E-UTRA RRC message instead of using the delta configuration indicator in the E-UTRA RRC message. The E-UTRA RRC message does not include the delta configuration indicator. The UE applies the delta configuration in response to the delta configuration indicator in the 5G NR RRC message. In one example, the NR RRC message indicates that the UE 110 shall apply the full configuration if the NR RRC message does not include the delta configuration indicator for the E-UTRA RRC message.

Base Station Inter-Radio Technology Handover Methods

Figure 7:
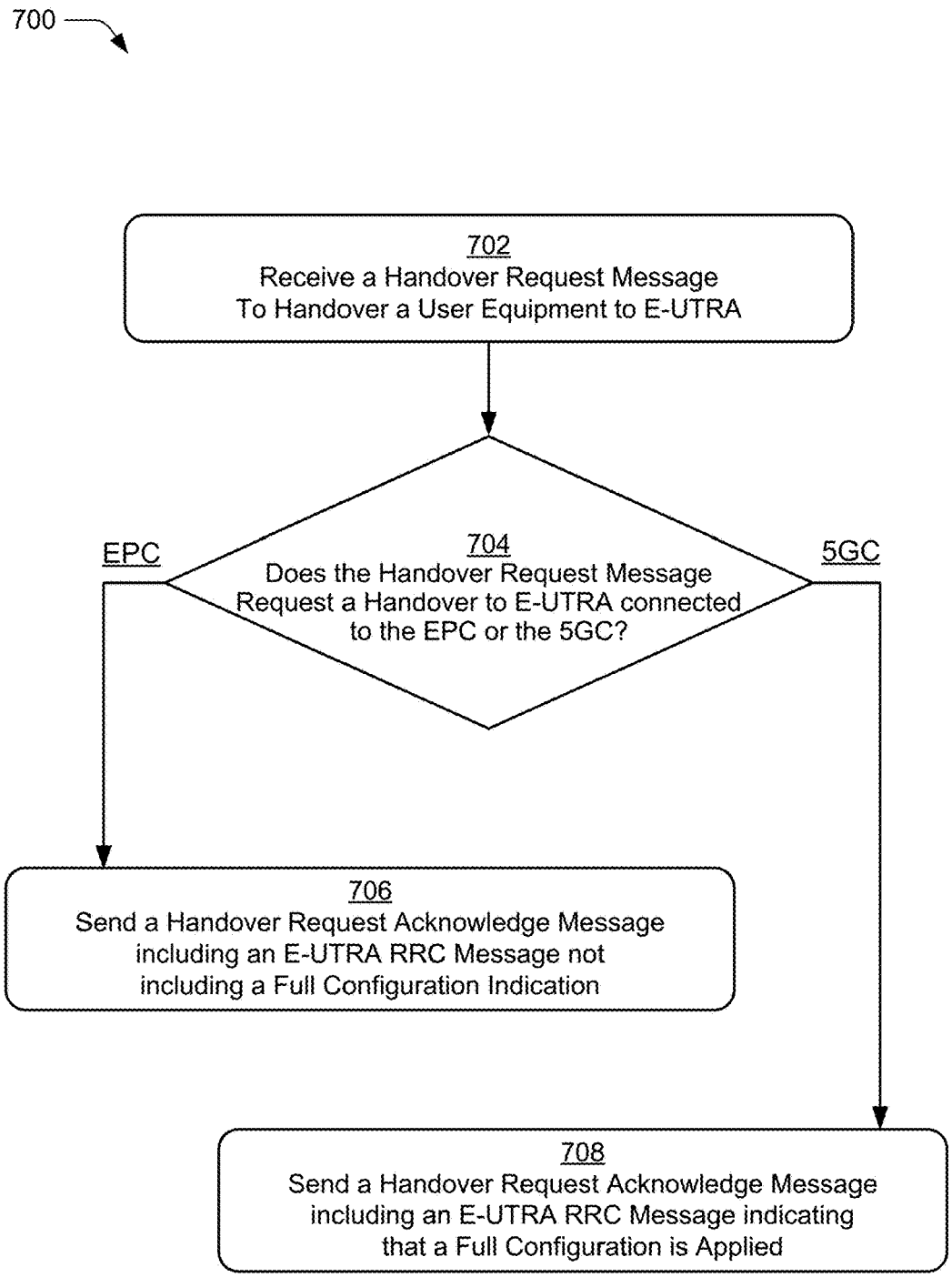
FIG. 7 illustrates an example method of an inter-radio access technology handover as generally related to protocol processing by the base station in a handover of the user equipment accordance with aspects of the techniques described herein.

FIG. 7 illustrates example method(s) 700 of an inter-radio access technology handover as generally related to protocol processing by the base station 122 in a handover of the UE 110. At block 702, a target base station (e.g., an E-UTRA base station) receives a Handover Request message to handover a UE to E-UTRA. For example, the base station 122 receives a Handover Request message to handover the user equipment 110 to E-UTRA.

At block 704, the E-UTRA base station determines if the Handover Request message requests a handover to an E-UTRA base station that is connected to an EPC network or a 5GC network. For example, the base station 122 determines if the Handover Request message requests a handover to an E-UTRA base station 120 that is connected to the EPC 160 or the 5GC 150.

At block 706, if the E-UTRA base station determines if the Handover Request message requests a handover to the E-UTRA base station that is connected to an EPC network, the E-UTRA base station sends a Handover Request Acknowledge message including an E-UTRA RRC message that does not include a full configuration indication. For example, if the base station 122 determines if the Handover Request message requests a handover to the E-UTRA base station 120 that is connected to the EPC 160, the base station 122 sends a Handover Request Acknowledge message including an E-UTRA RRC message that does not include a full configuration indication.

At block 708, if the E-UTRA base station determines if the Handover Request message requests a handover to the E-UTRA base station that is connected to a 5GC network, the E-UTRA base station sends a Handover Request Acknowledge message including an E-UTRA RRC message indicating that a full configuration is applied. For example, if the base station 122 determines if the Handover Request message requests a handover to the E-UTRA base station 120 that is connected to the 5GC 160, the base station 122 sends a Handover Request Acknowledge message including an E-UTRA RRC message that indicates that a full configuration is applied.

In aspects, the handover to EPC 160 from 5GC 150 comprises a handover to the E-UTRA base station 122 connected to the EPC 160 from NR RAN 141 or the handover comprises a handover to the E-UTRA base station 124 connected to EPC 160 from the base station 122 connected to 5GC 150.

In some cases, if the base station 122 receives the Handover Request message from a mobility management function in a core network (e.g., the MME 162 or the AMF 152), the base station 122 sends the Handover Request Acknowledge message to the mobility management function in the core network. Sending the Handover Request Acknowledge message to the mobility management function in the core network causes the mobility management function to send the E-UTRA RRC message to another base station 120, which transmits the E-UTRA RRC message to the UE 110. In a further aspect, if the base station 122 receives the Handover Request message from a third base station 120 in either the E-UTRAN 142 or NR RAN 141, the base station 122 sends the Handover Request Acknowledge message to the third base station 120, which transmits the E-UTRA RRC message to the UE 110.

If the base station 122 receives the Handover Request message on the S1 interface 106, the base station 122 may send the Handover Request Acknowledge message to the S1 interface 106. In some cases, however, if the base station 122 receives the Handover Request message on the X2 interface 114, the base station 122 sends the Handover Request Acknowledge message on the X2 interface 114. In another aspect, if the base station 122 receives the Handover Request message on the Xn interface, the base station 122 sends the Handover Request Acknowledge message on the Xn interface. In cases where the base station 122 is connected to the 5GC 150, the base station 122 may support communication via the Xn interface (illustrated at 116), as well as the X2 interface. In a further aspect, if the base station 122 receives the Handover Request message on the NG interface 180, the base station 122 sends the Handover Request Acknowledge message on the NG interface 180.

In further aspects, when the UE 110 receives the E-UTRA RRC message that does not include a full configuration indication, the UE 110 applies the full configuration by default although the first E-UTRA RRC message does not include that indication. Of course, when the UE 110 receives the E-UTRA RRC message indicating that the UE 110 shall apply the full configuration the UE 110 applies the full configuration according to the indication.

Figure 8:
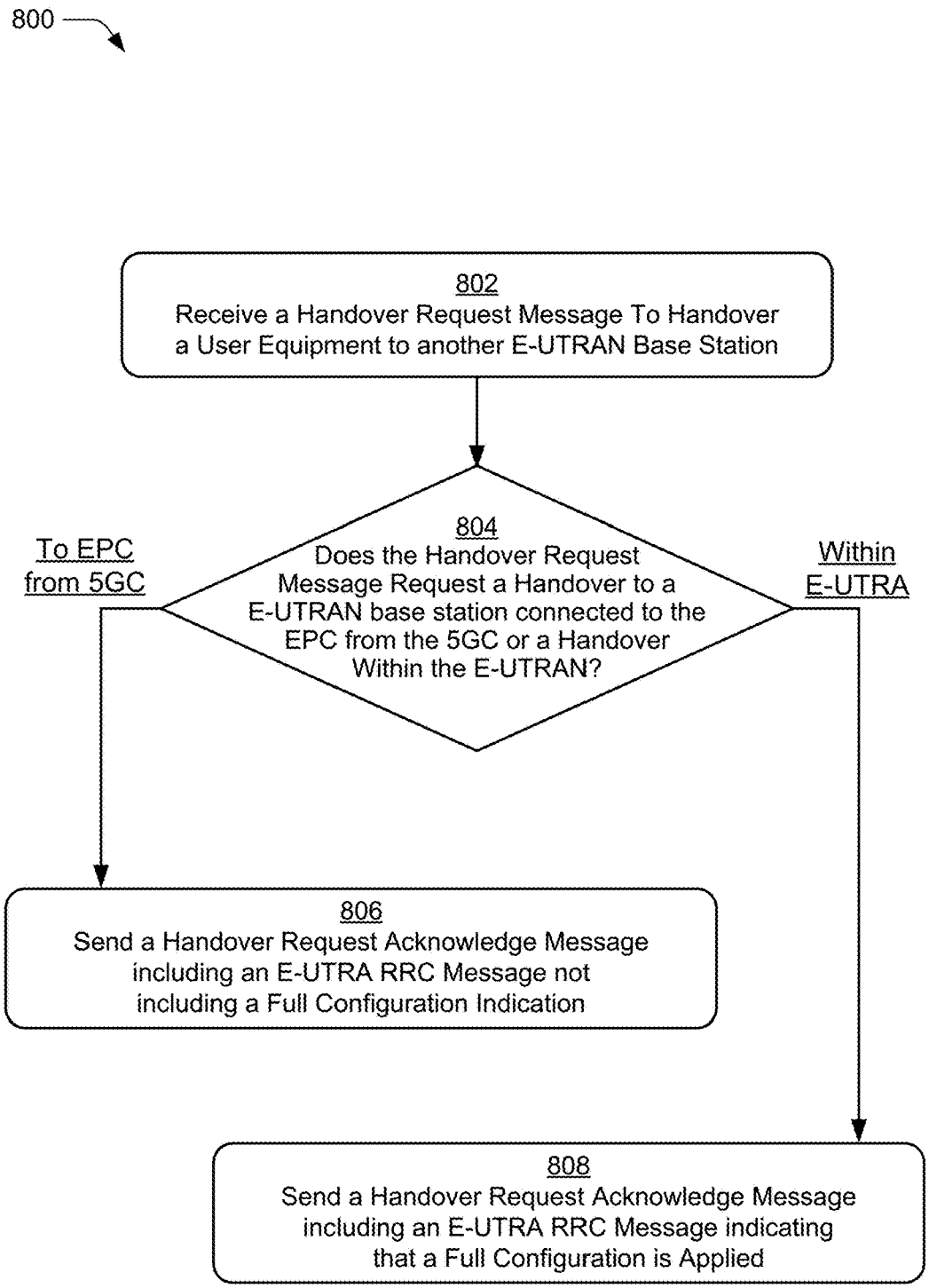
FIG. 8 illustrates an example method of an inter-radio access technology handover as generally related to protocol processing by the base station in a handover of the user equipment accordance with aspects of the techniques described herein.

FIG. 8 illustrates example method(s) 800 of an inter-radio access technology handover as generally related to protocol processing by the base station 124 in a handover of the UE 110. At block 802, an E-UTRA base station receives a Handover Request message to handover a UE to the E-UTRA base station. For example, the base station 124 receives a Handover Request message to hand over the UE 110 to the base station 124.

At block 804, the E-UTRA base station determines if the Handover Request message requests a handover to the E-UTRA base station with a core network changed to an EPC network from a 5GC network or a handover between base stations within the E-UTRAN, without changing a core network. For example, the base station 124 with a core network changed to the EPC 160 or the 5GC 150 or to the base station 124 within the E-UTRAN 142 without changing a core network.

At block 806, if the E-UTRA base station determines that the Handover Request message requests a handover to the E-UTRA base station with a core network changed to an EPC network from the 5GC network, the E-UTRA base station sends a Handover Request Acknowledge message including an E-UTRA RRC message that does not include a full configuration indication. For example, if the base station 124 determines the Handover Request message requests a handover to the E-UTRA base station 124 including changing the core network to EPC 160 from 5GC 150, the base station 124 sends a Handover Request Acknowledge message including an E-UTRA RRC message that does not include a full configuration indication.

At block 808, if the E-UTRA base station determines that the Handover Request message requests a handover within the E-UTRAN, the E-UTRA base station sends a Handover Request Acknowledge message including an E-UTRA RRC message indicating that a full configuration is applied by the UE. For example, if the base station 124 determines if the Handover Request message requests a handover within the E-UTRAN 142, the base station 124 sends a Handover Request Acknowledge message including an E-UTRA RRC message that indicates that a full configuration is applied by the UE 110.

In aspects, the handover to the base station 124, including changing to EPC 160 from 5GC 150, includes a handover to an E-UTRA base station 124 connected to the EPC 160 from NR RAN 141 or the handover comprises a handover to an E-UTRA base station 124 connected to EPC 160 from the base station 122 connected to 5GC 150.

In another aspect, if the base station 124 receives the Handover Request message from the mobility management function in a core network (e.g., a Mobility Management Entity (MME)) the base station 124 sends the Handover Request Acknowledge message to the mobility management function in the core network. Sending the Handover Request Acknowledge message to the mobility management function in the core network causes the mobility management function to send the E-UTRA RRC message to another base station 120, which transmits the E-UTRA RRC message to the UE 110. In a further aspect, if the base station 124 receives the Handover Request message from a third base station 120 in either the E-UTRAN 142 or NR RAN 141, the base station 124 sends the Handover Request Acknowledge message to the third base station 120, which transmits the E-UTRA RRC message to the UE 110.

If the base station 124 receives the Handover Request message on the S1 interface 106, the base station 124 may send the Handover Request Acknowledge message to the S1 interface 106. If the base station 124 receives the Handover Request message on the X2 interface 114, the base station 124 may send the Handover Request Acknowledge message on the X2 interface 114.

In further aspects, when the UE 110 receives the E-UTRA RRC message that does not include a full configuration indication, the UE 110 applies the full configuration by default although the first E-UTRA RRC message does not include that indication. Of course, when the UE 110 receives the E-UTRA RRC message indicating that the UE 110 shall apply the full configuration, the UE 110 applies the full configuration according to the indication.

Figure 9:
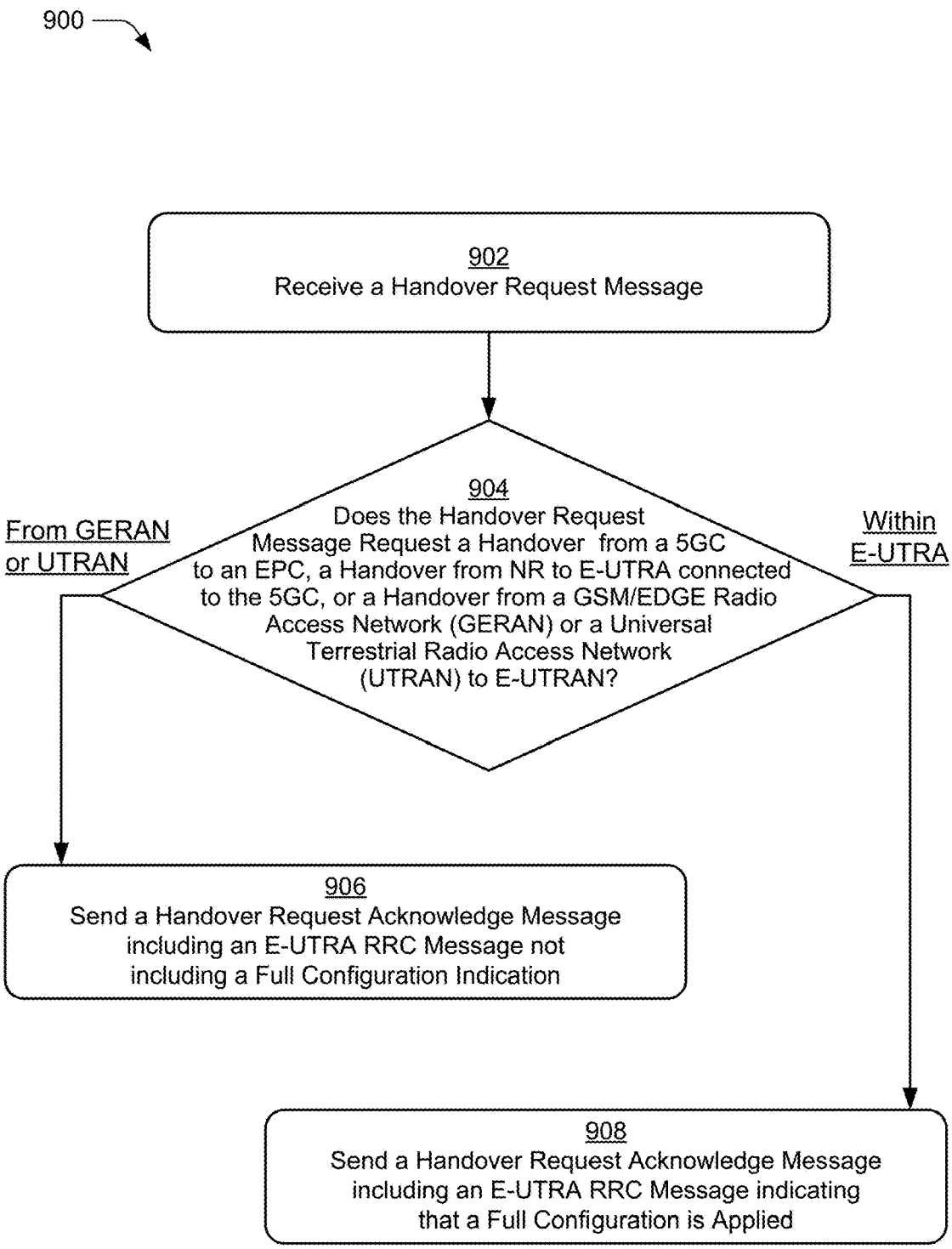
FIG. 9 illustrates an example method of an inter-radio access technology handover as generally related to protocol processing by the base station in a handover of the user equipment accordance with aspects of the techniques described herein.

FIG. 9 illustrates example method(s) 900 of an inter-radio access technology handover as generally related to protocol processing by the base station 122 in a handover of the UE 110. At block 902, an E-UTRA base station receives a Handover Request message to handover a UE from a 5GC network to an EPC network, to handover from NR to E-UTRA connected to the 5GC network, or to handover from a GSM/EDGE Radio Access Network (GERAN) or a Universal Terrestrial Radio Access Network (UTRAN) to E-UTRA. For example, the base station 122 receives a Handover Request message to handover the UE 110 from the 5GC 150 to the EPC 160, to handover from NR RAN 141 to E-UTRA 142 connected to the 5GC 150, or to handover from a GSM/EDGE Radio Access Network (GERAN) or a Universal Terrestrial Radio Access Network (UTRAN) to E-UTRAN 142.

At block 904, the E-UTRA base station determines if the Handover Request message requests a handover from the 5GC network to the EPC network, requests a handover from a NR base station to an E-UTRA base station connected to the 5GC network, or a handover from a GERAN or a UTRAN to E-UTRA. For example, the base station 122 determines if the Handover Request message requests a handover from the 5GC 150 to the EPC 160, a handover from NR RAN 141 to E-UTRAN 142 connected to the 5GC 150, or a handover from the GERAN or the UTRAN to E-UTRAN 142.

At block 906, if the E-UTRA base station determines that the Handover Request message requests the handover from a GERAN or a UTRAN to E-UTRA, the E-UTRA base station sends a Handover Request Acknowledge message including an E-UTRA RRC message that does not include a full configuration indication. For example, if the base station 122 determines that the Handover Request message requests the handover from the GERAN or the UTRAN to the E-UTRAN 142, the base station 122 sends a Handover Request Acknowledge message including an E-UTRA RRC message that does not include a full configuration indication.

At block 908, if the E-UTRA base station determines that the Handover Request message requests the handover from the 5GC network to the EPC network, or the handover from a NR base station to an E-UTRA base station connected to the 5GC network, the E-UTRA base station sends a Handover Request Acknowledge message including an E-UTRA RRC message indicating that a full configuration is applied. For example, if the base station 122 determines that the Handover Request message requests a handover from the 5GC 150 to the EPC 160 or requests a handover from NR RAN 141 to the E-UTRAN 142 connected to the 5GC, the base station 122 sends a Handover Request Acknowledge message including an E-UTRA RRC message that indicates that a full configuration is applied.

In some cases, the handover to EPC 160 from 5GC 150 comprises a handover to E-UTRAN 142 connected to the EPC 160 from NR RAN 141 or the handover comprises a handover to E-UTRAN 142 connected to EPC 160 from E-UTRAN 142 connected to 5GC 150.

If the base station 122 receives the Handover Request message from mobility management function in a core network (e.g., the MME 162 or the AMF 152), the base station 122 may send the Handover Request Acknowledge message to the mobility management function in the core network. Sending the Handover Request Acknowledge message to the mobility management function in the core network causes the mobility management function to send the E-UTRA RRC message to another base station 120 in the NR RAN 141 or a base station in a GERAN or UTRAN, which transmits the E-UTRA RRC message to the UE 110. If the base station 122 receives the Handover Request message from a third base station 120 in either the E-UTRAN 142 or NR RAN 141, the base station 122 may send the Handover Request Acknowledge message to the third base station 120, which transmits the E-UTRA RRC message to the UE 110.

In aspects, if the base station 122 receives the Handover Request message on the S1 interface 106, the base station 122 sends the Handover Request Acknowledge message to the S1 interface 106. In another aspect, if the base station 122 receives the Handover Request message on the X2 interface 114, the base station 122 sends the Handover Request Acknowledge message on the X2 interface 114. In another aspect, if the base station 122 receives the Handover Request message on the Xn interface 112, the base station 122 sends the Handover Request Acknowledge message on the Xn interface. In cases where the base station 122 is connected to the 5GC 150, the base station 122 may support communication via the Xn interface, as well as the X2 interface. In a further aspect, if the base station 122 receives the Handover Request message on the NG interface 180, the base station 122 sends the Handover Request Acknowledge message on the NG interface 180.

In further aspects, when the UE 110 receives the E-UTRA RRC message that does not include a full configuration indication, the UE 110 applies the full configuration by default although the first E-UTRA RRC message does not include that indication. Of course, when the UE 110 receives the E-UTRA RRC message indicating that the full configuration is applied, the UE 110 applies the full configuration according to the indication.

Figure 10:
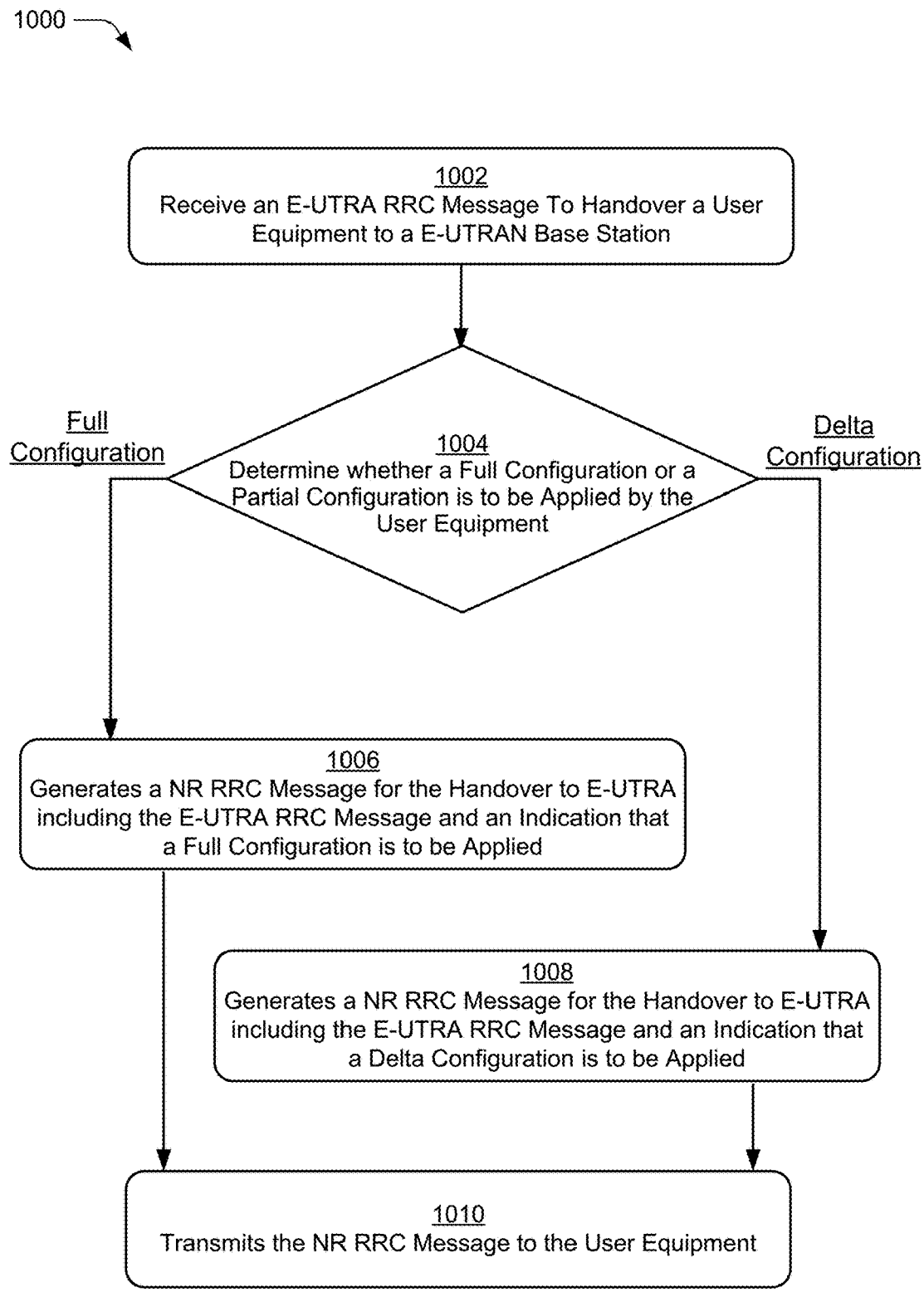
FIG. 10 illustrates an example method of an inter-radio access technology handover as generally related to protocol processing by the base station in a handover of the user equipment accordance with aspects of the techniques described herein.

FIG. 10 illustrates example method(s) 1000 of an inter-radio access technology handover as generally related to protocol processing by the base station 121 in a handover of the UE 110. At block 1002, a source base station (e.g., a 5G NR base station) receives an E-UTRA RRC message for a handover of a UE to a target base station (e.g., an E-UTRA base station). For example, the base station 121 receives an E-UTRA RRC message for a handover of the UE 110 to the base station 122. The E-UTRA RRC message may be received from the base station 122 or the AMF in the 5GC 150.

At block 1004, the 5G NR base station determines whether a full configuration or a delta configuration is to be applied by the UE. For example, the base station 121 determines whether a full configuration or a delta configuration is to be applied by the UE 110.

At block 1006, if the 5GNR base station determines that the full configuration is to be applied by the UE, the 5G NR base station generates a NR RRC message (e.g., an RRC-ConnectionReconfiguration message) for the handover to E-UTRA including the E-UTRA RRC message and an indication that the full configuration is to be applied. For example, if the base station 121 determines that the full configuration is to be applied by the UE 110, the base station 121 generates a NR RRC message for the handover to the E-UTRA base station 122 including the E-UTRA RRC message and an indication that the full configuration is to be applied (e.g., a fullConfig field in the RRCConnectionReconfiguration message).

At block 1008, if the 5GNR base station determines that the delta configuration is to be applied by the UE, the 5G NR base station generates a NR RRC message (e.g., an RRC-ConnectionReconfiguration message) for the handover to E-UTRA including the E-UTRA RRC message and an indication that the delta configuration is to be applied. For example, if the base station 121 determines that the delta configuration is to be applied by the UE 110, the base station 121 generates a NR RRC message for the handover to the base station 122 including the E-UTRA RRC message and an indication that the delta configuration is to be applied.

At block 1010, the 5GNR base station transmits the NR RRC message to the UE that causes the UE to perform a handover to the E-UTRAN and apply the indicated configuration. For example, the base station 121 transmits the NR RRC message to the UE 110, causing the UE to perform a handover to the base station 122 and apply the indicated full or delta configuration.

In an aspect, the base station 121 determines whether to apply the full configuration or the delta configuration. In another aspect, the base station 121 receives an indication of whether to apply the full configuration or the delta configuration from the base station 122. The base station 122 may indicate whether to apply the full configuration or the delta configuration in a Handover Request Acknowledge message or in an RRC container (e.g., Handover Command container).

In another aspect, the base station 121 receives the E-UTRA RRC message in a Handover Request Acknowledge message sent by the base station 122 in response to sending a Handover Request message to the base station 122, if there is an Xn interface between base stations 121 and 122.

In a further aspect, the base station 121 receives the E-UTRA RRC message in a Handover Command message from a mobility management function in the core network (e.g., an Access and Mobility Management Function (AMF)). The base station 121 sends a Handover Required message to the mobility management function and in response, receives the Handover Command message.

In an additional aspect, the NR RRC message may include a full configuration indicator to indicate the full configuration is applied for the E-UTRA RRC message or the NR RRC message may indicate the delta configuration is applied for the E-UTRA RRC message if the NR RRC message does not include the full configuration indicator. In another aspect, the NR RRC message may include a delta configuration indicator to indicate the delta configuration is applied for the E-UTRA RRC message. In a further aspect, the NR RRC message indicates the full configuration is applied if the NR RRC message does not include the delta configuration indicator for the E-UTRA RRC message.

Figure 11:
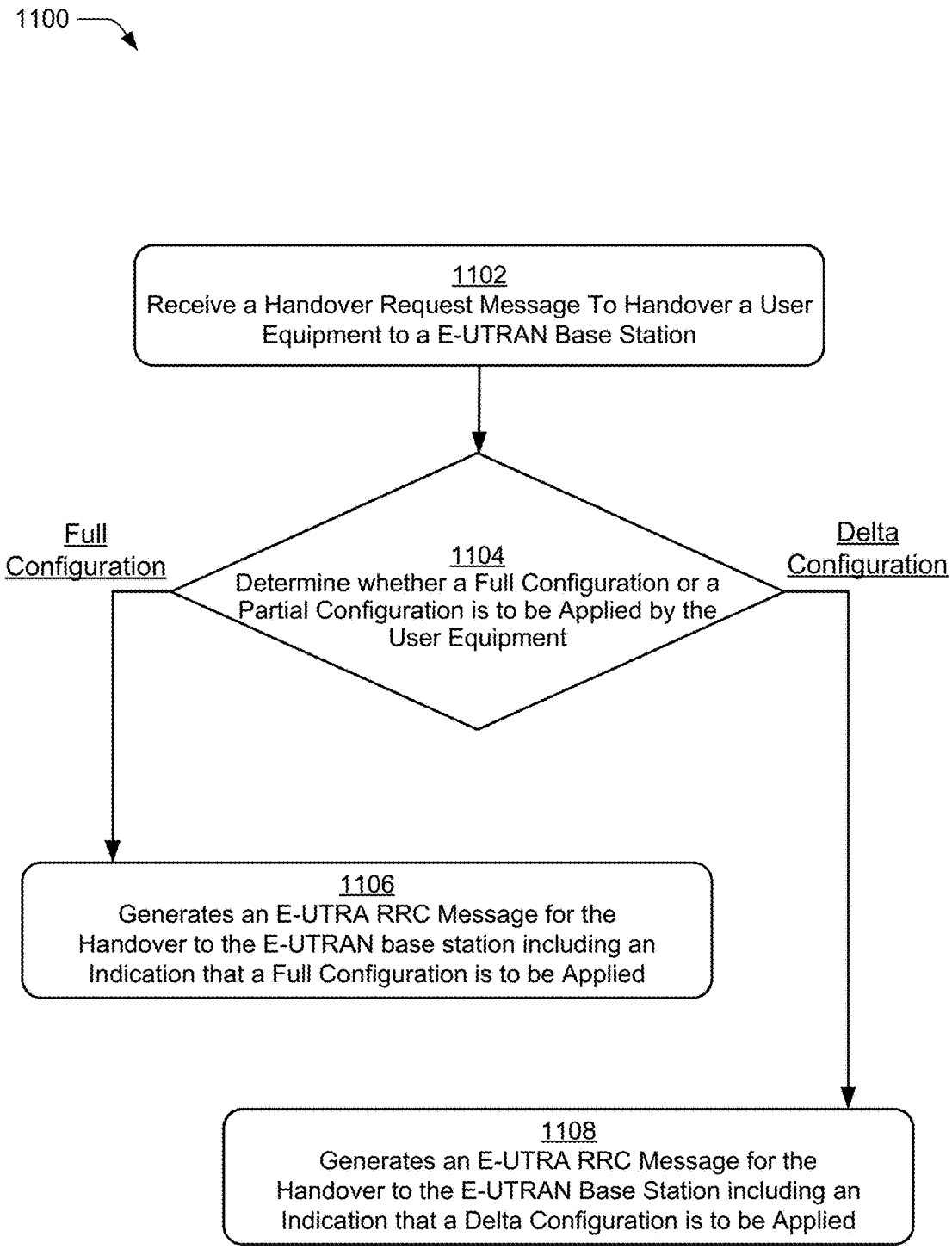
FIG. 11 illustrates an example method of an inter-radio access technology handover as generally related to protocol processing by the base station in a handover of the user equipment accordance with aspects of the techniques described herein.

FIG. 11 illustrates example method(s) 1100 of an inter-radio access technology handover as generally related to protocol processing by the base station 122 in a handover of the user equipment 110. At block 1102, an E-UTRA base station receives a Handover Request message for a handover of a UE to the E-UTRA base station. For example, the base station 122 receives a Handover Request message for a handover of a UE 110 to the base station 122.

At block 1104, the E-UTRA base station determines whether a full configuration or a delta configuration is to be applied by the UE. For example, the base station 122 determines whether a full configuration or a delta configuration is to be applied by the UE 110.

At block 1106, if the E-UTRA base station determines that the full configuration is to be applied by the UE, the E-UTRA base station generates an E-UTRA RRC message for the handover to the E-UTRA base station including an indication that the full configuration is to be applied. For example, if the base station 122 determines that the full configuration is to be applied by the UE 110, the base station 122 generates an E-UTRA RRC message for the handover to the base station 122 including an indication that the full configuration is to be applied.

At block 1108, if the E-UTRA base station determines that the delta configuration is to be applied by the UE, the E-UTRA base station generates an E-UTRA RRC for the handover to the E-UTRA base station including an indication that the delta configuration is to be applied. For example, if the base station 122 determines that the delta configuration is to be applied by the UE 110, the base station 122 generates an E-UTRA RRC message for the handover to the base station 122 including an indication that the delta configuration is to be applied or not including the indication that the full configuration is to be applied.

In one aspect, the E-UTRA base station transmits another E-UTRA RRC message to the UE causing the UE to perform a handover to another E-UTRA base station and apply the indicated configuration. For example, the base station 122 transmits the other E-UTRA RRC message to the UE 110, causing the user equipment 110 to perform a handover to the base station 124 and apply the indicated full or delta configuration.

In an aspect, the base station 122 determines whether to apply the full configuration or the delta configuration. In another aspect, the base station 122 receives an indication of whether to apply the full configuration or the delta configuration from the base station 123. The base station 123 may indicate whether to apply the full configuration or the delta configuration in a Handover Request message or in an RRC container (e.g., Handover Preparation Information container).

In another aspect, the base station 122 sends the E-UTRA RRC message in a Handover Request Acknowledge message to the base station 123 or the mobility management function in the core network. The E-UTRA RRC message may include a full configuration indicator to indicate the full configuration is applied. Sending the Handover Request Acknowledge message to the mobility management function in the core network causes the mobility management function to send the E-UTRA RRC message to the base station 123 in the NR RAN 141, which transmits the E-UTRA RRC message to the UE 110.

In a further aspect, the E-UTRA RRC message may include a delta configuration indicator to indicate the delta configuration is to be applied by the UE 110 or the E-UTRA RRC message may indicate that the full configuration is to be applied by the UE 110 if the E-UTRA RRC message does not include the delta configuration indicator.

In the following some examples are described—

Example 1

A method of performing a handover from a source base station to a target base station, the method comprising a user equipment:

communicating with the source base station using a Medium Access Control entity, a Radio Link Control entity, and a first Packet Data Convergence Protocol entity;

receiving a first Radio Resource Control message from the source base station, the first Radio Resource Control message including a second Radio Resource Control message for the handover to the target base station;

in response to the receiving the first Radio Resource Control message or the second Radio Resource Control message, releasing the Medium Access Control entity and the Radio Link Control entity; and determining a configuration type from an indication of a configuration type included in the second Radio Resource Control message.

Example 2

The method of example 1, wherein the target base station is connected to an Evolved Packet Core network, the method further comprising the user equipment:

determining that the configuration type is a full configuration; and based on the determining that the configuration type is the full configuration, releasing the first Packet Data Convergence Protocol entity.

Example 3

The method of example 2, further comprising the user equipment:

based on the second Radio Resource Control message, establishing a second a Packet Data Convergence Protocol entity with the target base station;

transmitting an RRCConnectionConfigurationComplete message; and communicating with the target base station using the second Packet Data Convergence Protocol entity.

Example 4

The method of example 3, further comprising the user equipment:

disconnecting from the source base station.

Example 5

The method of example 1, wherein the target base station is connected to a fifth-generation core network, the method further comprising the user equipment:

communicating with the source base station using the Medium Access Control entity, the Radio Link Control entity, the first Packet Data Convergence Protocol entity, and a first Service Data Adaptation Protocol entity;

determining that the configuration type is a full configuration; and based on the determining that the configuration type is the full configuration, releasing the first Packet Data Convergence Protocol entity and the first Service Data Adaptation Protocol entity.

Example 6

The method of example 5, further comprising the user equipment:

based on the second Radio Resource Control message:
establishing a second a Packet Data Convergence Protocol entity with the target base station;

establishing a second Service Data Adaptation Protocol entity with the target base station;

transmitting an RRCConnectionConfigurationComplete message; and communicating with the target base station using the second Packet Data Convergence Protocol entity and the second Service Data Adaptation Protocol entity.

Example 7

The method of example 6, further comprising the user equipment:

disconnecting from the source base station.

Example 8

The method of any one of the preceding examples, wherein the first Radio Resource Control message is an RRCConnectionReconfiguration message.

Example 9

The method of any one of the preceding examples, wherein the indication of a configuration type is a fullConfig field in the RRCConnectionReconfiguration message.

Example 10

The method of any one of the preceding examples, wherein the source base station is a fifth-generation new radio base station, and wherein the target base station is an Evolved Universal Terrestrial Radio Access base station.

Example 11

A user equipment comprising:
a wireless transceiver; and
a handover manager arranged to configure the user equipment to perform the method of any of examples 1 to 10.

Example 12

A method of performing a handover of a user equipment from a source base station to a target base station, the method comprising the source base station:

receiving a first Radio Resource Control message indicating a handover of the user equipment to the target base station;

determining a configuration type to be applied to the user equipment during the handover;

generating a second Radio Resource Control message;

including an indication of the configuration type in the second Radio Resource Control message;

including the first Radio Resource Control message in the second Radio Resource Control message; and transmitting the second Radio Resource Control message to the user equipment to direct the user equipment to modify a current user equipment configuration, based the configuration type during the handover.

Example 13

The method of example 12, wherein the configuration type is a full configuration or a delta configuration, wherein the second Radio Resource Control message is an RRCConnectionReconfiguration message, and wherein the indication of the configuration type is a fullConfig field in the RRCConnectionReconfiguration message.

Example 14

The method of example 12 or example 13, wherein the first Radio Resource Control message is received from the target base station or an Access and Mobility Management Function in a core network.

Example 15

A base station comprising:
a wireless transceiver;
a core network interface;
an inter-base station interface; and
a base station manager arranged to configure the base station to perform the method of any one of examples 12 to 14.

CONCLUSION

Although aspects of an inter-radio access technology handover have been described in language specific to features and/or methods, the subject of the appended claims is not necessarily limited to the specific features or methods described. Rather, the specific features and methods are disclosed as example implementations of the inter-radio access technology handover, and other equivalent features and methods are intended to be within the scope of the appended claims. Further, various different aspects are described, and it is to be appreciated that each described aspect can be implemented independently or in connection with one or more other described aspects.

What is claimed is:

1. A method of performing a handover from a source base station supporting a first Radio Access Technology (RAT) to a target base station supporting a second RAT, the method comprising a user equipment:

communicating with the source base station using a Medium Access Control entity, a Radio Link Control entity, a first Packet Data Convergence Protocol entity, and a first Service Data Adaptation Protocol entity;

receiving a first Radio Resource Control message from the source base station, the first Radio Resource Control message including a second Radio Resource Control message for the handover to the target base station;

in response to the receiving the first Radio Resource Control message or the second Radio Resource Control message, releasing the Medium Access Control entity and the Radio Link Control entity;

determining, from the second Radio Resource Control message, that a configuration type is a delta configuration; and based on the determining that the configuration type is the delta configuration, keeping the first Packet Data Convergence Protocol entity and the first Service Data Adaptation Protocol entity.

2. The method of claim 1, further comprising the user equipment:

transmitting an RRCConnectionConfigurationComplete message; and communicating with the target base station using the first Packet Data Convergence Protocol entity.

3. The method of claim 2, further comprising the user equipment:

disconnecting from the source base station.

4. The method of claim 1, wherein the first Radio Resource Control message is an RRCConnectionReconfiguration message.

5. The method of claim 4, wherein an indication of a configuration type is a fullConfig field in the RRCConnectionReconfiguration message.

6. The method of claim 1, wherein the source base station is a fifth-generation new radio base station, and wherein the target base station is an Evolved Universal Terrestrial Radio Access base station.

7. A user equipment comprising:
one or more wireless transceivers;
a processor; and
a memory comprising instructions for a handover manager executable by the processor to configure the user equipment to:
communicate with a source base station using a first Radio Access Technology (RAT), a Medium Access Control entity, a Radio Link Control entity, and a first Packet Data Convergence Protocol entity;
receive a first Radio Resource Control message from the source base station, the first Radio Resource Control message including a second Radio Resource Control message for a handover to a target base station that uses a second RAT;
in response to the reception of the first Radio Resource Control message or the second Radio Resource Control message, release the Medium Access Control entity and the Radio Link Control entity;
determine a configuration type from an indication of a configuration type included in the second Radio Resource Control message;
determine that the configuration type is a delta configuration;
based on the determining that the configuration type is the delta configuration, keep the first Packet Data Convergence Protocol entity;
transmit an RRCConnectionConfigurationComplete message; and
communicate with the target base station using the first Packet Data Convergence Protocol entity.

8. The user equipment of claim 7, wherein the target base station is connected to a fifth-generation core network, and wherein the instructions are executable to configure the user equipment to:
communicate with the source base station using the Medium Access Control entity, the Radio Link Control entity, the first Packet Data Convergence Protocol entity, and a first Service Data Adaptation Protocol entity.

9. The user equipment of claim 7, wherein the instructions are executable to configure the user equipment to:
disconnect from the source base station.

10. A method of performing a handover from a source base station supporting a first Radio Access Technology (RAT) to a target base station supporting a second RAT, the method comprising a user equipment:
communicating with a source base station using a Medium Access Control entity, a Radio Link Control entity, and a first Packet Data Convergence Protocol entity;
receiving a first Radio Resource Control message from the source base station, the first Radio Resource Control message including a second Radio Resource Control message for a handover to a target base station;
in response to the receiving the first Radio Resource Control message or the second Radio Resource Control message, releasing the Medium Access Control entity and the Radio Link Control entity;
determining a configuration type from an indication of a configuration type included in the second Radio Resource Control message;
determining that the configuration type is a delta configuration;
based on the determining that the configuration type is the delta configuration, keeping the first Packet Data Convergence Protocol entity;
transmitting an RRCConnectionConfigurationComplete message; and
communicating with the target base station using the first Packet Data Convergence Protocol entity.

11. The method of claim 10, wherein the target base station is connected to a fifth-generation core network, the method further comprising:
communicating with the source base station using the Medium Access Control entity, the Radio Link Control entity, the first Packet Data Convergence Protocol entity, and a first Service Data Adaptation Protocol entity.

12. The method of claim 10, the method further comprising:
responsive to the keeping the first Packet Data Convergence Protocol entity, disconnecting from the source base station.

* * * * *